US006871182B1

(12) United States Patent
Winnard et al.

(10) Patent No.: US 6,871,182 B1
(45) Date of Patent: Mar. 22, 2005

(54) ENGINEERING CHANGE DECISION ANALYSIS SYSTEM AND METHODOLOGY

(75) Inventors: Nancy Anne Winnard, Milford, MI (US); Barbara G. Fike, Southfield, MI (US); David Edward Winnard, Milford, MI (US); Gilbert Portalatin, South Lyon, MI (US); Janine Marie Bay, Milford, MI (US); Lawrence Joseph Liposky, Allen Park, MI (US); Michael Anthony Torolski, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 682 days.

(21) Appl. No.: 09/641,666

(22) Filed: Aug. 18, 2000

Related U.S. Application Data (60) Provisional application No. 60/164,649, filed on Nov. 10, 1999.

(51) Int. Cl.[7] ............................................. G06F 17/60
(52) U.S. Cl. ............................................. 705/7; 705/1
(58) Field of Search .................................. 705/1, 7, 10

(56) References Cited

U.S. PATENT DOCUMENTS

| | | | | |
|---|---|---|---|---|
| 5,208,765 A | * | 5/1993 | Turnbull ....................... | 702/84 |
| 5,216,612 A | * | 6/1993 | Cornett et al. ................ | 700/96 |
| 5,311,424 A | * | 5/1994 | Mukherjee et al. ........... | 705/29 |
| 5,515,269 A | * | 5/1996 | Willis et al. .................. | 705/29 |

(List continued on next page.)

FOREIGN PATENT DOCUMENTS

| | | | | |
|---|---|---|---|---|
| EP | 0 473 522 A2 | * | 4/1992 | ........... G06F/15/21 |
| EP | 0 520 923 A2 | * | 12/1992 | ........... G06F/15/21 |
| JP | 2000259703 | * | 9/2000 | ........... G06F/17/60 |

OTHER PUBLICATIONS

"Gartner offers Web-based analysis Tool", http://gartner11.gartnerweb.com/5_about/press_room/pr20000403b.html, 04/03/200 [retrieved Feb. 27, 2004], 2 pages, retrieved from: Archive.org and google.com.*
"ROI Analysis", medicalogic.com, May 8, 1998 [retrieved Sep. 3, 2003], pp. 1–14, retrieved from: google.com and archive.org.*
DPL 4.0, www.adainc.com, Feb./1999–Apr./1999 [retrieved Nov. 14, 2002 and Sep. 3, 2003], pp. 1–37, retrieved from archive.org and google.com.*

*Primary Examiner*—Tariq R. Hafiz
*Assistant Examiner*—Beth Van Doren
(74) *Attorney, Agent, or Firm*—David B. Kelley (57) ABSTRACT

A system and method of operating a computer to perform risk and decision analysis of an engineering design change in a product are provided. The method includes the steps of displaying a list of change drivers that are causing the engineering design changes and receiving a selection of a change driver from a user, displaying a set of questions soliciting general cost information associated with the engineering design change, and displaying a set of questions soliciting change driver-specific information associated with the selected change driver. The method then receives answers to the set of general cost questions from the user, and also receives answers to the set of change driver-specific questions from the user. The method then computes an expected value associated with the engineering design change using the answers saved in memory, a value associated with not implementing the engineering design change using the change driver-specific answers saved in memory, and then compares the computer expected value with the value from not making the change to generate a recommendation of whether the engineering design change should be implemented in response to the comparison.

18 Claims, 5 Drawing Sheets

U.S. PATENT DOCUMENTS

| | | | | |
|---|---|---|---|---|
| 5,539,652 A | * | 7/1996 | Tegethoff | 703/14 |
| 5,799,286 A | * | 8/1998 | Morgan et al. | 705/30 |
| 5,924,077 A | * | 7/1999 | Beach et al. | 705/10 |
| 5,956,691 A | * | 9/1999 | Powers | 705/4 |
| 6,081,654 A | * | 6/2000 | Morman et al. | 703/1 |
| 6,088,678 A | * | 7/2000 | Shannon | 705/8 |
| 6,321,205 B1 | * | 11/2001 | Eder | 705/7 |
| 6,393,406 B1 | * | 5/2002 | Eder | 705/7 |
| 6,449,597 B1 | * | 9/2002 | McGill | 705/1 |
| 6,490,569 B1 | * | 12/2002 | Grune et al. | 705/400 |

* cited by examiner

ENGINEERING CHANGE DECISION ANALYSIS SYSTEM AND METHODOLOGY

RELATED PATENT APPLICATIONS

This application claims benefit of U.S. Provisional Application No. 60/164,649, entitled Risk and Decision Analysis Model, and filed on Nov. 10, 1999.

TECHNICAL FIELD OF THE INVENTION

This invention is related in general to the field of software engineering and analysis systems. More particularly, the invention is related to an engineering change decision analysis system and methodology.

BACKGROUND OF THE INVENTION

In manufacturing, engineering changes, particularly late engineering changes, introduce timing uncertainty, additional effort, and analysis difficulty. Additional expense may also be incurred for reengineering, re-tooling, and re-testing. Many manufacturers view late changes as undesirable for these reasons and impose restraints to implementing late changes to discourage or minimize them. An objective and comprehensive methodology is therefore desirable to weigh the advantages and disadvantages associated with late engineering design changes in order to determine whether they should be instituted.

SUMMARY OF THE INVENTION

There is a need for an engineering change and decision analysis system and method that enables manufacturing companies to evaluate changes associated with engineering designs and to make objective, informed and comprehensive decisions related to the engineering designs. Although the invention is particularly applicable to analyzing late engineering design changes, it is also applicable to other applications where many factors are involved to shape a decision making process. In accordance with the present invention, an engineering change decision analysis system and methodology is provided which eliminates or substantially reduces the disadvantages associated with prior ad hoc decision making processes.

In one aspect of the invention, a method of operating a computer to perform an engineering change and decision analysis of an engineering design change in a product is provided. The method includes the steps of displaying a list of change drivers that are causing the engineering design changes and receiving a selection of a change driver from a user, displaying a set of questions soliciting general cost information associated with the engineering design change, and displaying a set of questions soliciting change driver-specific information associated with the selected change driver. The method then receives answers to the set of general cost questions from the user, and also receives answers to the set of change driver-specific questions from the user. The method then computes an expected value associated with the engineering design change using the answers saved in memory, a value associated with not implementing the engineering design change using the change driver-specific answers saved in memory, and then compares the computed expected value with the value from not making the change to generate a recommendation of whether the engineering design change should be implemented in response to the comparison.

In another aspect of the invention, a method of operating a computer to perform an engineering change decision analysis of an engineering design change in a product includes the steps of receiving a selection of a change driver that is driving the engineering design change, receiving general cost information associated with the engineering design change, and receiving change driver-specific information associated with the selected change driver. The method then computes an expected value associated with the engineering design change using the general cost information, a value associated with not implementing the engineering design change using the change driver-specific information, and then compares the computed cost and value to generate a recommendation of whether the engineering design change should be implemented.

In yet another aspect of the invention, a computer-implemented engineering change decision analysis system for analyzing an engineering design change in a product is provided. The system includes a graphical user interface operating on a computer to receive a selection of a change driver that is driving the engineering design change, general cost information associated with the engineering design change, and change driver-specific information associated with the selected change driver. The system further includes an analysis logic program operating the computer to compute expected value associated with the engineering design change using the general cost information, compute an expected value associated with not implementing the engineering design change using the change driver-specific information, and compare the computed cost and value and generate a recommendation of whether the engineering design change should be implemented in response to the comparison.

A technical advantage of the present invention is the ability to methodically extract data from a cross-functional team and to use the data to deduce logically a recommendation of whether a particular engineering design change should be implemented. The engineering design change and the data are analyzed based on the driver that is causing the change. The engineering change analysis system accounts for uncertainty by giving users the option of entering highest, lowest and best estimates of various data and their respective probabilities, so that the users do not have to input definite numbers. In this manner, the cost and impact of an engineering design change may be properly weighed and analyzed in an objective way as part of the decision making process.

BRIEF DESCRIPTION OF THE DRAWINGS

For a better understanding of the present invention, reference may be made to the accompanying drawings, in which.

DETAILED DESCRIPTION OF THE INVENTION

Figure 1:
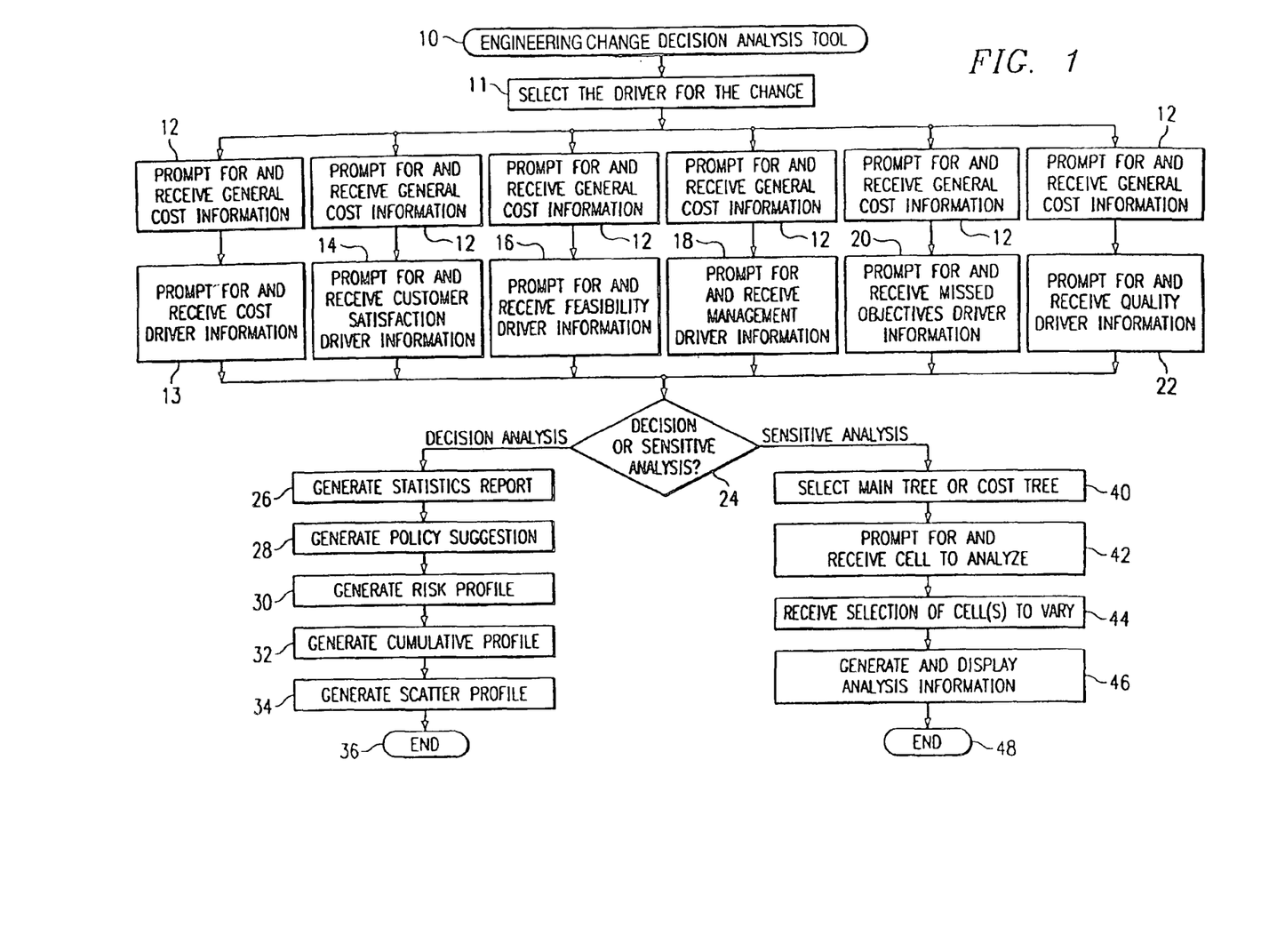
FIG. 1 is a flowchart of an embodiment of an engineering change decision analysis system and methodology according to the teachings of the present invention.

FIG. 1 is a flowchart of an embodiment of an engineering change decision analysis system and methodology 10 according to the teachings of the present invention. Although the present invention is described herein as applied to the engineering change decision analysis associated with engineering design changes in the vehicle manufacturing industry, the present invention may be adapted to other decision making applications.

An engineering change decision analysis system and methodology 10 of the present invention employ a user interface, such as a graphical user interface, that prompts users for specific information needed for the analysis and allows the user to easily enter the information. In block 11, an engineering change decision analysis system 10 prompts for a selection of the factor that is driving the analysis or, in the present application, driving the late engineering design change. Six categories of change drivers are contemplated. One change driver is cost, either to minimize incurring cost or to lower cost. A second change driver is customer satisfaction, due to a necessity to react to a competitive product or to satisfy a known customer need or want. A third change driver is feasibility, which is to address a manufacturing or assembly issue. A fourth change driver is management directed, as a result of management reviews and evaluations. A fifth change driver is missed objectives, which needs a design revision to achieve a target. A sixth change driver is quality to avoid a potential customer notification program or warranty. The graphical user interface may display the six change driver categories in a pull down list to facilitate the user's selection. The user's selection of a change driver category allows the user to proceed to block 12, where the user is prompted for general cost information associated with the proposed engineering design change. Analysis system 10 prompts for general cost information by displaying to the user a number of questions. Exemplary general cost questions refer to the "base program" as the manufacturing or design program without the engineering change. General cost questions may include:

General Background:
1. What is the number of units or vehicles that the engineering change affects?
2. What is the expected average profit per vehicle?

Piece Cost:
1. What is the best estimate for the incremental piece cost variance over the base program?
2. What is the confidence level of the best piece cost estimate?
3. What is the highest estimate for the incremental piece cost variance over the base program?
4. What is the probability of achieving the highest piece cost?
5. What is the lowest estimate for the incremental piece cost variance over the base program?

Tooling Cost:
1. What is the best estimate of the tooling variance over the base program?
2. What is the probability of the best estimate?
3. What is the highest estimate for the tooling variance over the base program?
4. What is the probability of achieving the highest tooling cost?
5. What is the lowest estimate for the tooling variance over the base program?

Assembly Cost:
1. What is the estimated tooling and facilities cost variance over the base program?
2. What is the best estimate of the assembly time variance, in minutes, over the base program?
3. What is the probability of the best estimate?
4. What is the highest estimate of the assembly time variance, in minutes, over the base program?
5. What is the probability of the highest estimate?
6. What is the lowest estimate of the assembly time of the variance, in minutes, over the base program?

Test/Warranty Variance:
1. Will the late engineering design change be verified by a design verification program?
2. What is the estimated cost associated with conducting a design verification program for the engineering change?
3. What is the best estimate, highest estimate, lowest estimate of warranty variance, and their respective probabilities, over the base program?

After responding to the change driver selection question and the general cost information questions, one of six worksheets are displayed to prompt for further information according to the change driver category selected. In block 13, cost driver questions are displayed to solicit information if the user selected cost as the change driver in block 11. Listed below are exemplary questions that solicit cost driver information.
1. What are the engineering resources (annualized headcount) required to support the change?

If the user selected customer satisfaction as the change driver category, analysis system 10 prompts for and receives customer satisfaction driver information, as shown in block 14. Exemplary questions displayed by the user interface of analysis system 10 are listed below:
1. What is the probability that customers will be indifferent to the change and purchase the vehicle anyway?
2. If the change is not made, what percentage of customers will be upset but purchase the vehicle anyway?
3. Of the customers that purchase the vehicle, what percentage is likely to have a warranty claim which this change would prevent?
4. Assuming the customer repairs the vehicle on warranty, what is the best estimate, highest estimate, and lowest estimate of warranty cost and their respective probabilities?
5. If the customer does not fix the vehicle, what is the probability that he/she will be dissatisfied to some extent, but still live with the condition?
6. Is not making the change likely to result in adverse publicity?
7. On a scale from 1 to 10, what is the severity of customer dissatisfaction for not making the change?
8. What is the estimated cost of a customer notification program?
9. What are the engineering resources (annualized headcount) required to support the change?

If the user indicated that feasibility is the change driver in block 11, then questions related to feasibility are displayed to prompt user input, as shown in block 16. Examples of feasibility information questions include:
1. If no design change is made, what is the estimated per unit cost to change the process?
2. What is the probability for accommodating the current design by changing the process?
3. If no design change is made, what is the estimated per unit cost of increased assembly time required to accommodate the current design?
4. What is the probability of accommodating the current design by adding labor?
5. If no design change is made, what is the number of lost production units per hour?
6. How many shifts does the plant run?
7. What are the engineering resources (annualized headcount) required to support the change?

If the user selected the management directed category in block 11, then questions aimed to solicit information related to this category are displayed to prompt user input, as shown in block 18. Examples of these questions include:
1. What is the probability that customers will be indifferent to the change and purchase the vehicle anyway?
2. If the change is not made, what percentage of customers will be upset but purchase the vehicle anyway?
3. Of the customers that purchase the vehicle, what percentage is likely to have a warranty claim which this change would prevent?
4. Assuming the customer repairs the vehicle on warranty, what is the best estimate, highest estimate, and lowest estimate of warranty cost and their respective probabilities?
5. What are the engineering resources (annualized headcount) required to support the change?

If the selected change driver is missed objectives, then questions to solicit information related to this category are displayed, as shown in block 20. Exemplary missed objective information questions may include:
1. What is the probability that customers will be indifferent to the change and purchase the vehicle anyway?
2. If the change is not made, what percentage of customers will be upset but purchase the vehicle anyway?
3. Of the customers that purchase the vehicle, what percentage is likely to have a warranty claim which this change would prevent?
4. Assuming the customer repairs the vehicle on warranty, what is the best estimate, highest estimate, and lowest estimate of warranty cost and their respective probabilities?
5. If the customer does not fix the vehicle, what is the probability that he/she will be dissatisfied to some extent, but still live with the condition?
6. Is not making the change likely to result in adverse publicity?
7. On a scale from 1 to 10, what is the severity of customer dissatisfaction for not making the change?
8. What is the estimated cost of a customer notification program?
9. What are the engineering resources (annualized headcount) required to support the change?

Quality driven change prompts the display of questions associated with this category, as shown in block 22. Exemplary questions include:
1. What is the probability that customers will be indifferent to the change and purchase the vehicle anyway?
2. If the change is not made, what percentage of customers will be upset but purchase the vehicle anyway?
3. Of the customers that purchase the vehicle, what percentage is likely to have a warranty claim which this change would prevent?
4. Assuming the customer repairs the vehicle on warranty, what is the best estimate, highest estimate, and lowest estimate of warranty cost and their respective probabilities?
5. If the customer does not fix the vehicle, what is the probability that he/she will be dissatisfied to some extent, but still live with the condition?
6. Is not making the change likely to result in adverse publicity?
7. On a scale from 1 to 10, what is the severity of customer dissatisfaction for not making the change?
8. What is the estimated cost of a customer notification program?
9. Can the change be made within the program timing?
10. What are the engineering resources (annualized headcount) required to support the change?

It may be seen from the foregoing that worksheets for a number of change driver categories may contain questions that request identical or similar information. Since the user only encounters and responds to one of the worksheets, the questions are not repetitive. It should be emphasized that the above questions are merely examples and may be tailored, deleted, and added to for other applications and to suit different corporate operations and cultures.

In block 24, the user interface of analysis system 10 prompts the user to indicate whether decision analysis or sensitivity analysis is desired. Alternatively, the system may automatically proceed to decision analysis and then give the user the option of performing sensitive analysis. If the user selects decision analysis, a statistics report is generated, as shown in block 26. A statistics report provides the expected value of the optimum decision and the variance around the expected value due to uncertainty. Thereafter, a policy suggestion report, a risk profile report, a cumulative risk profile report, and a scatter profile report are generated and available for display to the user, as shown in blocks 28–34. The policy suggestion report preferably shows the reduced version of the preferred decision tree that led to the optimum decision. The engineering change analysis profile report preferably displays the possible outcomes of the decision as a discrete probability graph, in which the probability that the outcome equals certain values is shown. The cumulative engineering change analysis profile report preferably displays the cumulative distribution of possible outcome values. The scatter profile report preferably shows a plot of the values of all the possible outcomes for the optimum decision path and the probability of each outcome. The generation and display of these reports may be selectively chosen by the user to provide more in-depth information. The decision analysis process then terminates in block 36 and the user may return to block 24 or proceed to sensitivity analysis. The user may perform sensitivity analysis multiple times, each time varying the cell selection and/or range of the variance.

If, in block 24, the user selects a sensitivity analysis, then analysis system ID selects a decision logic tree 50 (FIGS. 2A–2C) or a decision cost tree 220 (FIG. 3) in which a cell value may be further analyzed, shown in block 40. Decision cost tree 220 may be seen as a subroutine that computes the cost of the late engineering design change if it is implemented. The cost computed by decision cost tree 220 is then used in the analysis in the main decision logic tree to reach the recommended solution. Analysis system 10 then prompts for a cell to analyze in block 42, and receives the selection of the cell or cells to vary in block 44. Two types of sensitivity analysis may be conducted—one-way or two-way. A one-way analysis graphically displays the expected value of the cell being analyzed while varying only one variable at a time. A two-way analysis graphically displays the variation of the expected value of the cells being analyzed while changing two variables simultaneously. The graphical user interface provides data fields for the user to indicate the cell or cells to vary and to suggest values or ranges of values for the cells. The system then generates and displays the sensitivity analysis information in appropriate graphical and/or tabular manner. The process terminates in block 48.

Figure 2A:
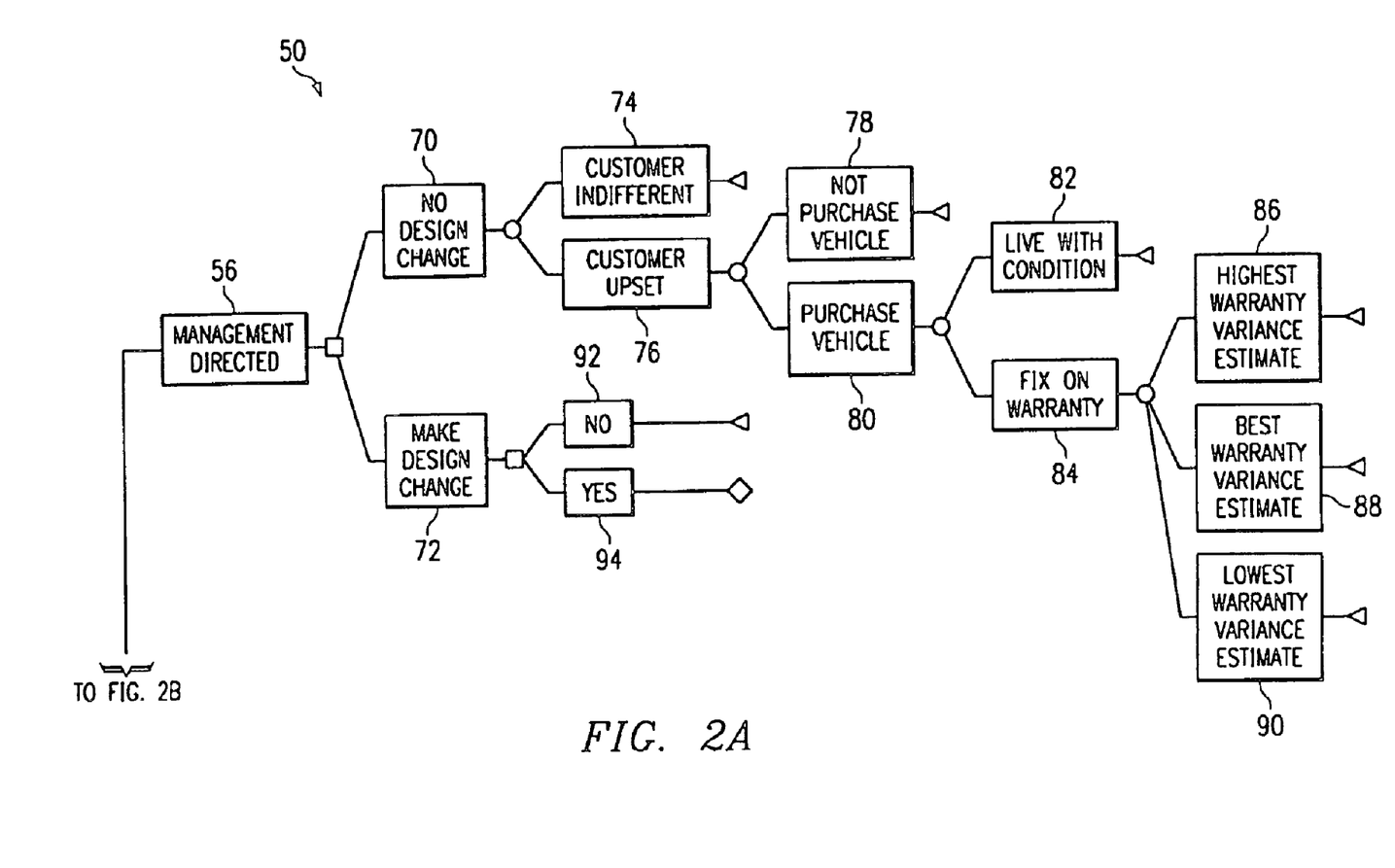
FIGS. 2A–2C make up a decision flow diagram of an embodiment of the engineering change decision analysis system and methodology according to the teachings of the present invention.
Figure 2B:
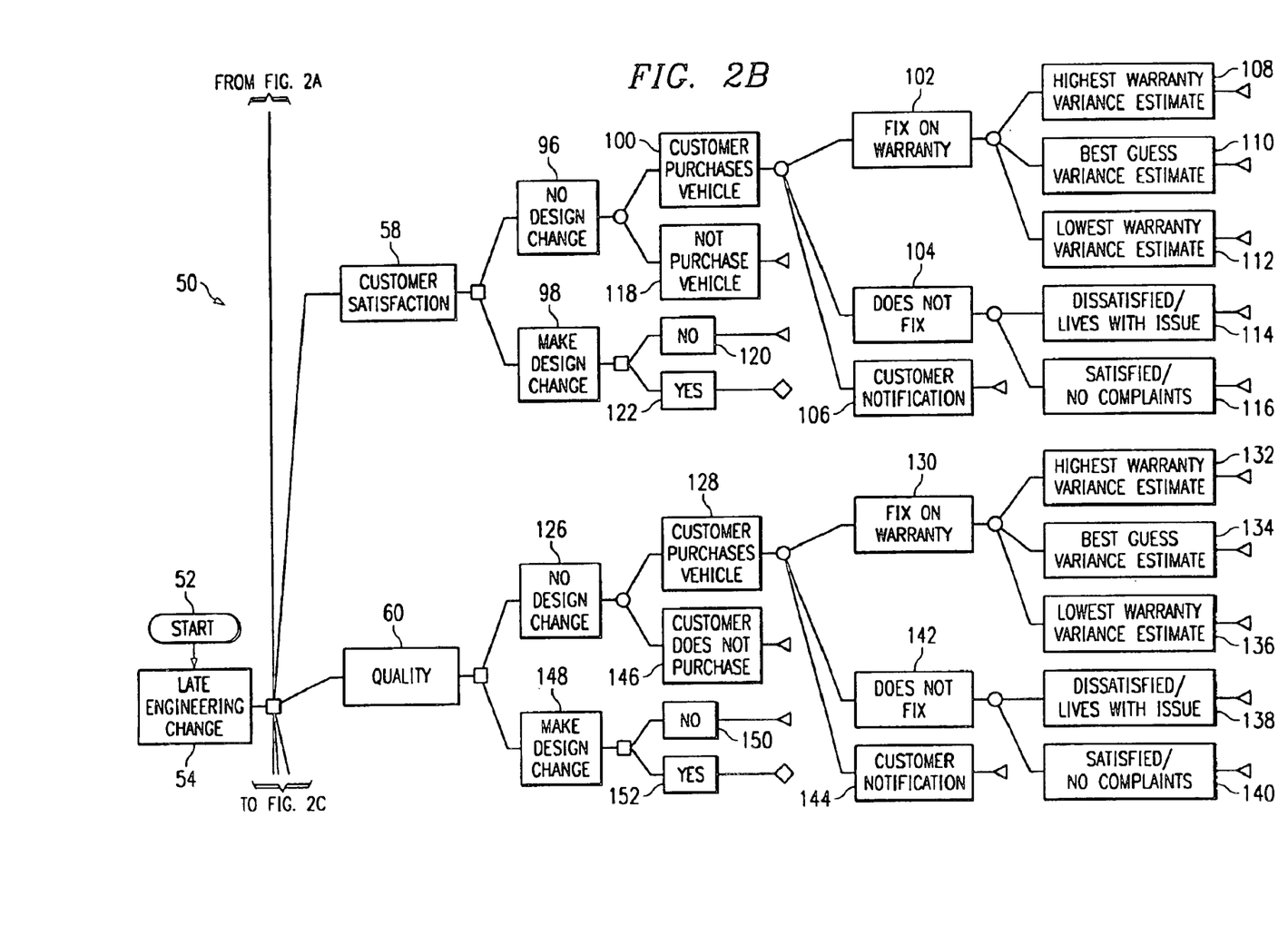
Figure 2C:
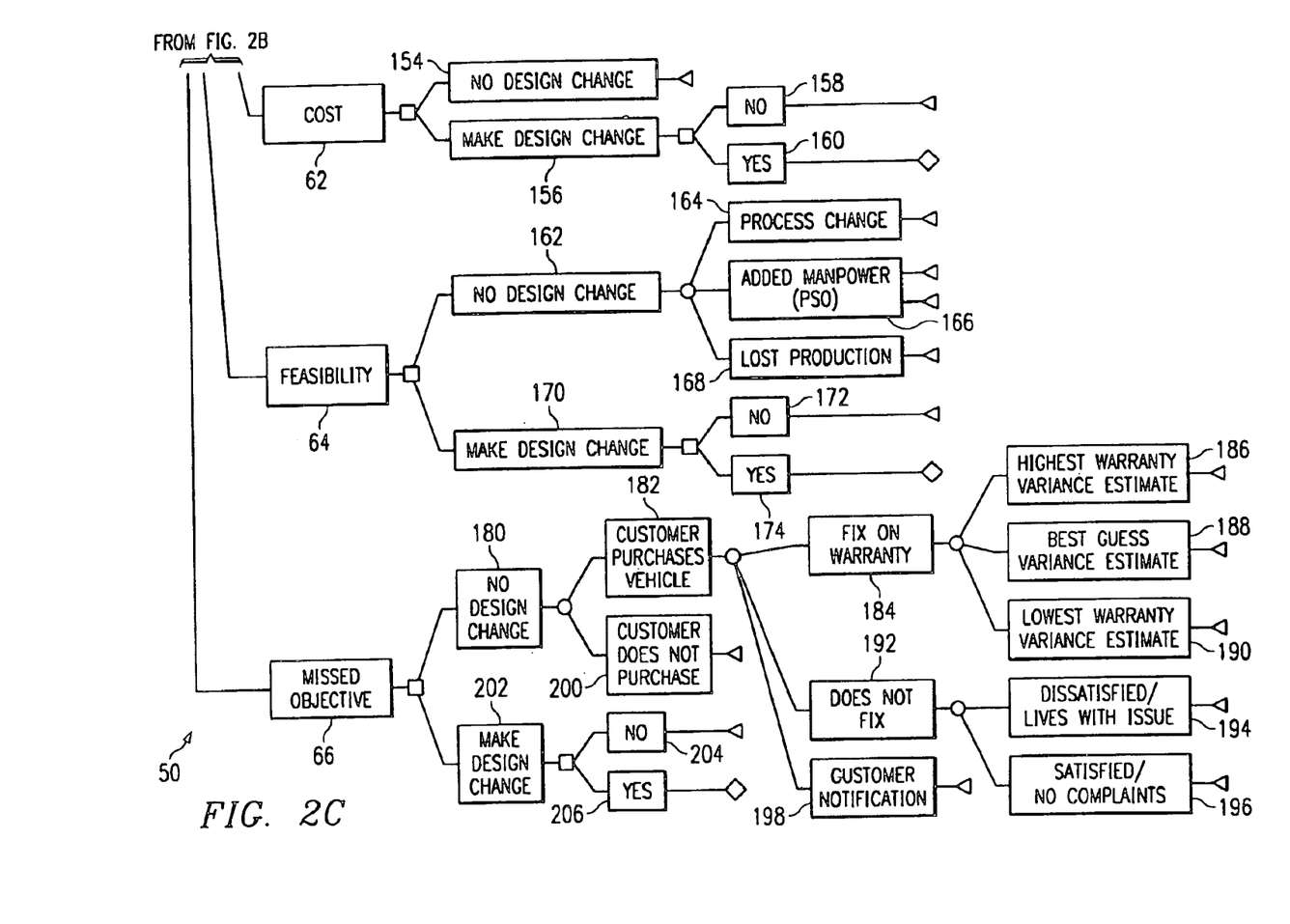

FIGS. 2A–2C make up a decision flow diagram of an embodiment of a decision logic tree 50 of the engineering decision analysis system and methodology according to the teachings of the present invention. The user responses to the questions posed on the worksheets are collected and used in decision logic tree 50 in the analysis. In an embodiment of the present invention, the user responses to the questions on the worksheets are inserted into cells in an Excel spreadsheet, and a Visual Basic software application implementing decision logic tree 50 extracts the values from the cells in the Excel spreadsheet and performs the analysis and computations. Decision logic tree 50 is an analysis for engineering change 54. Based on the engineering design change being analyzed, a change driver category was selected by the user from among management directed 45, customer satisfaction 58, quality 60, cost 62, feasibility 64, and missed objective 66. Depending on the user's selection, the analysis in each respective change driver path is followed. Management directed path 56 is traversed if the change driver causing the late engineering design change is management directed. Customer satisfaction path 58 is traversed if the selected change driver is customer satisfaction. Similarly, quality path 60 is traversed if the selected change driver is quality, and cost path 62 is traversed if the selected change driver is cost. Feasibility path 64 is traversed if the selected change driver is feasibility, and missed objectives path 66 is traversed if the selected change driver is missed objectives. Once the specific change driver path is selected, the path is traversed from the right to the left. Therefore, the values of the two main branches of each respective path, to make the design change and to not make the design change are determined. In order to determine the expected value for making the design change, certain costs associated with making the change are computed by a cost decision tree 220, as shown in FIG. 3.

Figures 3, 4:
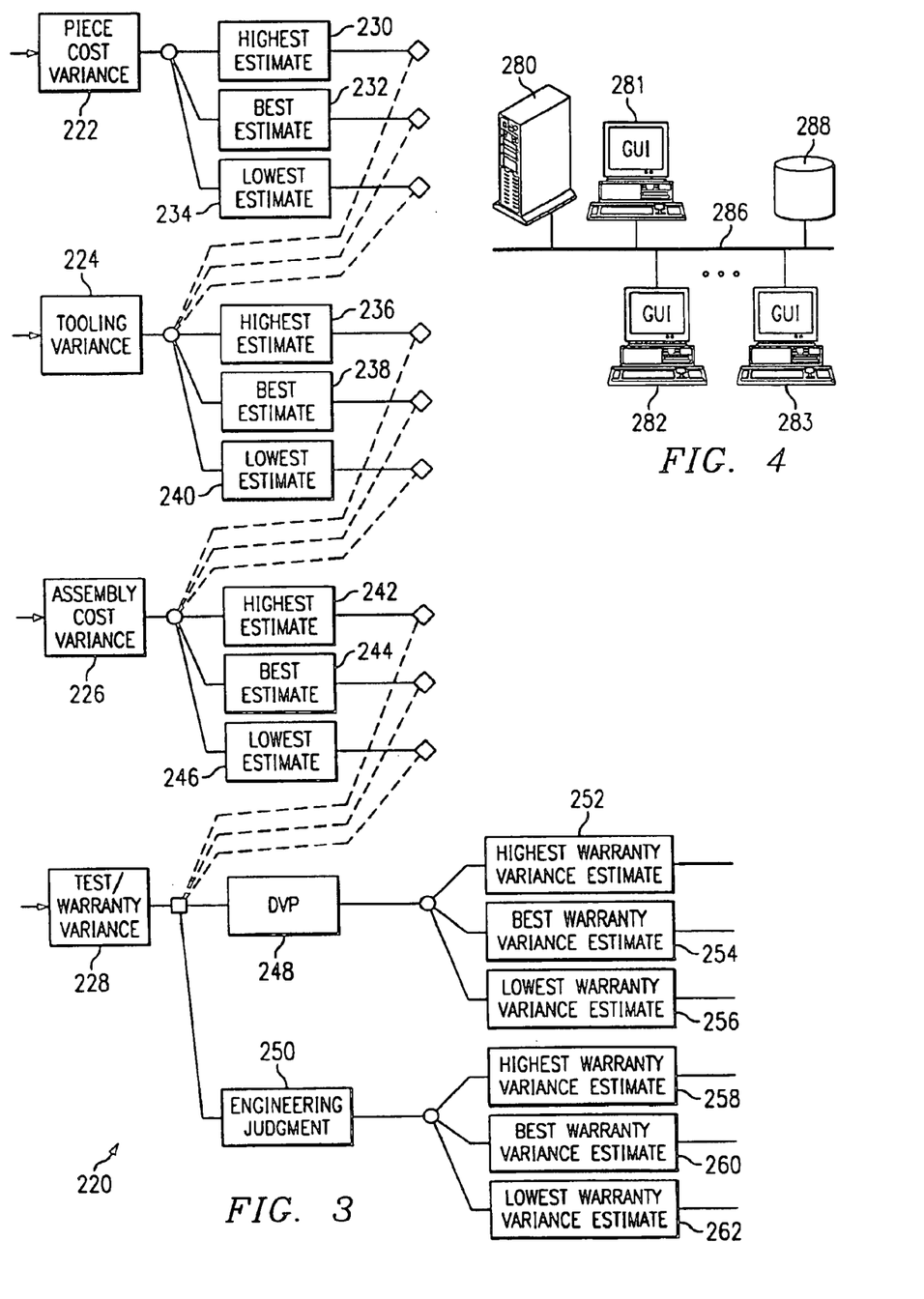
FIG. 3 is a decision flow diagram of an embodiment of a cost analysis process of the engineering change decision analysis system and methodology according to the teachings of the present invention.
FIG. 4 is a simplified block diagram of the hardware environment of the invention hardware according to an embodiment of the present invention.

FIG. 3 is a decision flow diagram of an embodiment of a cost decision tree 220 of the engineering change decision analysis system and methodology according to the teachings of the present invention. Cost decision tree 220 is used to compute the piece cost variance 222, tooling cost variance 224, assembly cost variance 226, and test/warranty cost variance 228 when the late engineering design change is made. The input to cost decision tree 220 is the user's response to the questions on the general cost information worksheet. For the computation of piece cost variance computation 222, the highest estimated incremental piece cost 230, the best estimated incremental piece cost 232, and the lowest estimated incremental piece cost 234 are combined with tooling cost variance 224, assembly cost variance 226, and test/warranty cost variance 228 derived in the respective branches.

Starting at the test/warranty cost variance branch 228 at the bottom of cost decision tree 220, the user's indication of whether DVP or a formal design verification plan 248 will be used to verify the design change or engineering judgment 250 will be relied upon. Depending on the user's selection, one of two paths is traversed to determine the warranty variance costs. The logic behind this computation is that the effect of engineering judgment or the amount of testing being conducted is reflected in warranty costs. The more complete the testing program, the lower the number of warranty repairs is likely to be. Therefore, based on whether a formal verification process will be performed or engineering judgment will be relied on, the user is asked to enter the best, highest and lowest estimate of warranty variance over the base program and the respective probabilities. The total cost of warranty may be calculated by:

Total cost of waranty=–(R/1000)×(cost/repair)×(volume/1000)

where R is the best, highest or lowest estimated number of warranty repairs. The test/warranty cost variance is calculated and "brought" up to the computation in assembly cost variance branch 226. The assembly cost variance, including tooling and facilities cost variance, is computed. The total assembly cost may be calculated by:

Total assembly cost=–(time in minutes)×($50/hour)×(volume)/60 minutes where the assembly time in minutes and volume are values entered by the user on the general cost information worksheet. The test/warranty variance is added to the assembly cost variance with the highest probability and "brought" up to the computation of tooling cost variance branch 224. The total tooling cost variance is a value entered by the user in the general cost worksheet, and the value with the highest probability is added to the value "brought" up from assembly cost variance branch 226. The sum from tooling cost variance branch 224 is then added to the piece cost variance with the highest probability. The total variance piece cost may be computed by:

Total variance piece cost=–(piece cost)×(volume)

The resulting sum is the cost estimate when the late engineering design change is made. When the cost estimate value is negative, it indicates a cost savings is the result of the late engineering design change; when the cost estimate value is positive, it indicates an added cost over the base program is needed in order to implement the change. The cost estimate from cost decision tree 220 is then "brought" into or plugged into decision logic tree 50 wherever the cost of the change is needed in the analysis, as indicated by diamond icons.

Referring to FIG. 2B, the change cost estimate is the cost of make design change branch 72 in the management directed path. Nodes 92 and 94 are no and yes responses to the question of whether program timing would be met if the change is implemented. If the answer to this question is no, the outcome of the decision analysis is always to recommend not implementing the late engineering design change, as meeting program timing is a requirement.

In the no design change path 70, the user's highest, best, and lowest estimates 86, 88, and 90 of the cost to repair the vehicle on warranty and their respective probabilities are used to determine the cost associated with fixing the vehicles on warranty 84 if the design change is not made. The user-entered percentage of customers that would fix the vehicle on warranty determines what percentage of the cost associated with customers living with the condition 82 and percentage of the cost associated with customers fixing the vehicle on warranty would be advanced to the next level. The user-entered percentage of customers that would be upset but purchase the vehicle anyway determines the likelihood that a customer will be indifferent 74 or a customer will be upset and not purchase the vehicle 78 or a customer will be upset but purchase the vehicle anyway 80. If a majority of the customers would be upset and not purchase the vehicle because of the condition without the change, then the weighting for making the change would be increased. In this manner, a value to gauge customer satisfaction is generated. The cost for making the change is then compared with the customer satisfaction value and the most optimal path is chosen to either recommend making the change or not making the change.

If the user had indicated that the change driver is customer satisfaction, then the customer satisfaction path 58 (FIG. 2C) would be traversed. The logic in this path is similar to management directed 56, where the cost of the change is computed in the decision cost tree and used herein in a make design change branch 98. Similarly, if the implementation of the change causes the program to not meet the required time goals, then no change is recommended. In the no design change branch 96, and working from right to left, a warranty cost is computed for purchased vehicles that are corrected on warranty 102 using the highest warranty variance estimate 108, best warranty variance estimate 110, and lowest warranty variance estimate 112, and their respective probabilities. There also exists the option that the customer choosing to not fix the problem 104 either because he is satisfied with no complaints 116 or he is dissatisfied but lives with the condition 114. With the user's input of probability for each situation, the optimal path is selected for the does not fix 104 branch. A third option, if viewed as a probability, is customer notification 106 weighed by a user estimate of its cost. The user-supplied probabilities for the branches 102, 103, and 106 are used to select the most optimal and probable path for the customer purchase vehicle branch 100. This is compared with the weighting for the customer not purchase vehicle branch 118 to arrive at a value for no design change 96.

If the change driver is quality, then the quality path 60 is traversed. The logic for quality path 60 may be structured similarly to customer satisfaction path 58. The cost of the change is computed in the decision cost tree and used herein in a make design change branch 148. Similarly, if the implementation of the change causes the program to not meet the required time goals, then no change is recommended. In the no design change branch 124, and working from right to left, a warranty cost is computed for purchased vehicles that are corrected on warranty 130 using the highest warranty variance estimate 132, best warranty variance estimate 134, and lowest warranty variance estimate 136, and their respective probabilities. There also exists the option that the customer choosing to not fix the problem 142 either because he is satisfied with no complaints 140 or he is dissatisfied but lives with the condition 138. With the user's input of probability for each situation, the optimal path is selected for the does not fix branch 142. A third option, if viewed as a probability, is customer notification 144 weighed by a user estimate of its cost. The user-supplied probabilities for the branches 130, 142, and 144 are used to select the most optimal and probable path for the customer purchase vehicle branch 128. This is compared with the weighting for the customer not purchase vehicle branch 146 to arrive at a value for no design change 126. This is then compared with the cost of making the change to provide the analysis recommendation.

If the change driver is cost, then the cost path 62 (FIG. 2E) is traversed for the analysis. Again, not meeting the program timing (158) would cause the outcome of the analysis to be not make the change regardless of the cost involved with not making the change. If the implementation of the change meets program timing 160, then the cost of the change computed in the decision cost tree (FIG. 3) is used to determine the cost of making the design change 156, which is compared with not making the design change 154. A recommendation of whether the engineering design change should be implemented is based on this comparison.

If the change driver is feasibility, the feasibility path 64 of decision logic tree 50 is traversed. Not meeting the program timing (172) would cause the outcome of the analysis to be not make the change regardless of the cost involved with not making the change. If the implementation of the change meets program timing 174, then the cost of the change computed in the decision cost tree (FIG. 3) is used to determine the cost of making the design change 170, which is compared with not making the design change 162. In the no design change branch 162, the costs and probabilities that the feasibility problem is corrected by something other than the design change is determined. For example, the assembly process may be changed (164) or added manpower and assembly time (166) may be provided to correct the feasibility issue. Alternatively, if nothing is done to address the feasibility issue, the user-supplied lost production data is used to weigh the lost production branch 168 against the process change branch 164 and added manpower branch 166. The optimal path between not making the design change 162 and making the design change 170 is then chosen.

The missed objective path 66 of the decision logic tree may be similar to the customer satisfaction path 58 and the quality path 60, as shown in FIG. 2G. The cost of the change is computed in the decision cost tree and used herein in a make design change branch 202. Similarly, if the implementation of the change causes the program to not meet the required time goals, then no change is recommended. In the no design change branch 180, and working from right to left, a warranty cost is computed for purchased vehicles that are corrected on warranty 184 using the highest warranty variance estimate 186, best warranty variance estimate 188, and lowest warranty variance estimate 190, and their respective probabilities. There also exists the option that the customer choosing to not fix the problem 192 either because he is satisfied with no complaints 196 or he is dissatisfied but lives with the condition 194. With the user's input of probability for each situation, the optimal path is selected for the does not fix branch 192. A third option, if viewed as a probability by the user, is customer notification 198 weighed by a user's estimate of its cost. The user-supplied probabilities for the branches 184, 192, and 198 are used to select the most optimal and probable path for the customer purchase vehicle branch 182. This is compared with the weighting for the customer not purchase vehicle branch 200 to arrive at a value for no design change 180. This is then compared with the cost of making the change to provide the final recommendation.

In the manner described above, the user's replies to the questions in the worksheets are plugged into the decision logic in order to properly weigh each path and determine the optimal path of whether the late engineering design change in question should be implemented. It is preferable that the responses are supplied by a cross-functional team in order to avoid individual personal biases. For example, team members preferably include design engineers, development engineers, manufacturing engineers, and program management, finance, and purchasing personnel. Note that the decision logic does not consider changes involving safety and regulations, which are considered mandatory and must be implemented.

It should be understood that the decision logic of the present invention may be modified to be tailored to engineering change decision making involving products other than automotive vehicles. Furthermore, it may be seen that the decision tree logic show in the figures may be implemented in software code in alternative ways. For example, a knowledge-based expert system may be implemented for specific products of a manufacturing enterprise to obtain information and navigate through the risk analysis logic to arrive at a recommendation. Furthermore, decision analysis system 10 may use a graphical user interface implemented in a web browser-displayable format, such as hypertext markup language (HTML), dynamic HTML, extensible markup language (XML), and extensions thereof. Alternatively, programming languages may be used, such as Visual Basic, to develop the visual front end of engineering change analysis system 10. The user-entered data in data fields displayed by the graphical user interface may be extracted by portable platform-independent applications coded in C, C++, JAVA, or another suitable programming languages.

FIG. 4 is a simplified block diagram of the hardware environment of the invention hardware according to an embodiment of the present invention. The software program of the present invention may reside on a network server or an intranet server, which is accessible to multiple users working on multiple computers 281–283 simultaneously. Computers 281–283 are linked to network server 280 by a network 286. Therefore, the present invention may function in a client-server mode. Alternatively, the software of the present invention may reside on individual computers. A database 288 linked to server 280 and computers 281–283 may be used for storing system data and data received from the users.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method of operating a computer to perform an engineering change decision analysis of an engineering design change in a product, comprising:

displaying a list of change drivers that is are driving the engineering design change and receiving a selection of a change driver from a user;

displaying a first set of questions soliciting general cost information associated with the engineering design change, the first set of questions including (i) a highest, best, and lowest warranty variance estimate and probability for warranting the product manufactured with the engineering design change, and (ii) a highest, best, and lowest warranty variance estimate and probability associated with the product manufactured without product verification testing;

receiving answers to the first set of questions;

displaying a second set of questions soliciting change driver-specific information associated with the selected change driver, and receiving answers thereto;

computing with a computer a cost associated with the engineering design change using the answers to the first set of questions wherein computing the cost includes (i) computing a cost variance associated with warranty of the product manufactured with the engineering design change with and without product verification testing, (ii) computing a cost variance associated with producing the product manufactured with the engineering design change, the production cost variance including tooling and assembly costs, and (iii) summing the warranty cost variance with the production cost;

computing a value associated with not implementing the engineering design change using the change driver-specific answers; and comparing the computed costs and value and generating a recommendation of whether the engineering design change should be implemented in response to the comparison.

2. The method, as set forth in claim 1, wherein displaying a set of general cost questions and receiving answers thereto comprise displaying a question requesting for highest, best, and lowest assembly cost variance estimates for manufacturing the product with the engineering design change, and respective probabilities, and receiving answers thereto.

3. The method, as set forth in claim 1, wherein displaying a set of general cost questions and receiving answers thereto comprise displaying a question requesting for highest, best, and lowest tooling cost variance estimates for manufacturing the product with the engineering design change, and respective probabilities, and receiving answers thereto.

4. The method, as set forth in claim 1, wherein displaying a set of general cost questions and receiving answers thereto comprise displaying a question requesting for highest, best, and lowest incremental piece cost variance estimates for manufacturing the product with the engineering design change, and respective probabilities, and receiving answers thereto.

5. The method, as set forth in claim 1, wherein displaying a list of change drivers comprises displaying a list including management directed, customer satisfaction, quality, cost, feasibility, and missed objective change drivers.

6. The method, as set forth in claim 1, wherein displaying a set of questions soliciting change driver-specific information comprises displaying a question requesting whether a required condition will be met by implementing a late engineering design change.

7. The method, as set forth in claim 1, wherein displaying a set of questions soliciting change driver-specific information comprises displaying a question requesting highest, best, and lowest warranty variance estimates for work on the product without the engineering design change.

8. The method, as set forth in claim 1, wherein displaying a set of questions soliciting change driver-specific information comprises displaying a question requesting a percentage of customers who purchase the product despite the lack of implementing the engineering design change.

9. A computer-implemented engineering change decision analysis system for analyzing an engineering design change in a product, comprising:

a graphical user interface operating on a computer to receive input comprising:

(i) selection of a change driver that is driving the engineering design change, (ii) general cost information associated with the engineering design change, including (a) the highest, best and lowest warranty variance estimates and probability for warranting the product manufactured with the engineering design change, and (b) a highest, best and lowest warranty variance estimate and probability associated with the product manufactured without product verification testing and (iii) change driver-specific information associated with the selected change driver; and an analysis logic program operating the computer configured to:

(i) compute a cost associated with the engineering design change using the general cost information wherein computing the cost includes (a) computing a cost variance associated with warranty of the product manufactured with the engineering design chance and without product verification testing, (b) computing a cost variance associated with producing the product manufactured with the engineering design change, the production cost including tooling and assembly costs, and (c) summing the warranty cost variance with the production cost, (ii) compute a value associated with not implementing the engineering design change using the change driver-specific information, and (iii) compare the computer cost and value and generate a recommendation of whether the engineering design change should be implemented in response to the comparison.

10. The system, as set forth in claim 9, wherein the graphical user interface operable to receive an identification of specific data in the general cost information or the change driver-specific information to vary, and the analysis logic program operating the computer to vary the specific data, and compare the computer cost and value and generating an output in response to varying the specific data.

11. The system, as set forth in claim 9, wherein the graphical user interface is operable to receive general cost information comprising highest, best, and lowest assembly cost variance estimates for manufacturing the product with the engineering design change, and respective probabilities.

12. The system, as set forth in claim 9, wherein the graphical user interface is operable to receive general cost information comprising highest, best, and lowest tooling cost variance estimates for manufacturing the product with the engineering design change, and respective probabilities.

13. The system, as set forth in claim 9, wherein the graphical user interface is operable to receive general cost information comprising highest, best, and lowest incremental piece cost variance estimates for manufacturing the product with the engineering design change, and respective probabilities.

14. The system, as set forth in claim 9, wherein the graphical user interface is operable to receive the selection of the change driver comprising a selection from among management directed, customer satisfaction, quality, cost, feasibility, and missed objective change drivers.

15. The system, as set forth in claim 9, wherein the graphical user interface is operable to receive change driver-specific information comprising an indication of whether a required condition will be met by implementing a late engineering design change, and wherein the analysis logic program generating a recommendation of not implementing the engineering design change in response to the indication that the required condition will not be met.

16. The system, as set forth in claim 9, wherein the graphical user interface is operable to receive change driver-specific information comprising highest, best, and lowest warranty variance estimates for work on the product without the engineering design change.

17. The system, as set forth in claim 9, wherein the graphical user interface is operable to receive change driver-specific information comprising a percentage for customers who purchase the product despite the lack of implementing the engineering design change.

18. The system, as set forth in claim 9, wherein the graphical user interface is operable to receive change driver-specific information comprising a probability for addressing feasibility issues by changing assembly process, and by adding manpower and assembly time, instead of implementing the engineering design change.

* * * * *